US012779448B2

(12) United States Patent
Spallek et al.

(10) Patent No.: US 12,779,448 B2
(45) Date of Patent: Nov. 3, 2026

(54) SYSTEM AND METHOD FOR INSERTING A SAMPLE INTO A CHAMBER

(71) Applicant: kiutra GmbH, Munich (DE)

(72) Inventors: Jan Peter Spallek, Munich (DE); Alexander Regnat, Munich (DE); Klaus Bernhard Eibensteiner, Mondsee (AT)

(73) Assignee: Kiutra GmbH, Munich (DE)

( * ) Notice: Subject to any disclaimer, the term of this patent is extended or adjusted under 35 U.S.C. 154(b) by 1166 days.

(21) Appl. No.: 17/280,070

(22) PCT Filed: Oct. 1, 2019

(86) PCT No.: PCT/EP2019/076594
§ 371 (c)(1),
(2) Date: Mar. 25, 2021

(87) PCT Pub. No.: WO2020/070128
PCT Pub. Date: Apr. 9, 2020

(65) Prior Publication Data
US 2021/0331151 A1 Oct. 28, 2021

(30) Foreign Application Priority Data
Oct. 5, 2018 (EP) .................................... 18198846

(51) Int. Cl.
*B01L 1/02* (2006.01)
*B01L 7/00* (2006.01)

(52) U.S. Cl.
CPC .................. *B01L 1/02* (2013.01); *B01L 7/50* (2013.01); *B01L 2200/026* (2013.01);
(Continued)

(58) Field of Classification Search
CPC ........ B01L 1/02; B01L 7/50; B01L 2200/026; B01L 2200/0689; B01L 2300/041; B01L 2300/047; B01L 2300/0848
See application file for complete search history.

(56) References Cited

U.S. PATENT DOCUMENTS 5,039,864 A 8/1991 Kondo
2007/0115446 A1 5/2007 Nishimura
(Continued)

FOREIGN PATENT DOCUMENTS

JP 2000133691 A 5/2000
KR 20110071289 A 6/2011
WO 2010106309 A2 9/2010

OTHER PUBLICATIONS

Kiutra Gmbh, "sample-transfer-1024x483.png", 1 (2018), XP055564274, Germany, URL:https://kiutra.com/wp-content/uploads/, 1 Page.
(Continued)

*Primary Examiner* — Matthew D Krcha
*Assistant Examiner* — Austin Q Le
(74) *Attorney, Agent, or Firm* — Ruggiero McAllister & McMahon LLC; Edward L McMahon

(57) ABSTRACT

A sample insertion system (10) comprises a channel (12), a sealing element (16) and a vacuum device (18). The channel (12) has a port (14) connectable to a chamber such as a cryostat. The vacuum device (18) may decrease a pressure in the channel (12). The sealing element (16) is arranged in the channel (12) and seals off a volume (V) from the channel. The sealing element (16) comprises a carrier member to carry a sample. The sealing element (16) is configured to move the carrier member towards the port (14) in response to the pressure in the channel (12) decreasing below a pressure in the volume (V) sealed-off by the sealing element
(Continued)

(16). This may help reducing an access time when inserting the sample into the chamber.

10 Claims, 8 Drawing Sheets

(52) U.S. Cl.
CPC . *B01L 2200/0689* (2013.01); *B01L 2300/041* (2013.01); *B01L 2300/047* (2013.01); *B01L 2300/0848* (2013.01)

(56) References Cited

U.S. PATENT DOCUMENTS

| | | | | |
|---|---|---|---|---|
| 2013/0168549 | A1* | 7/2013 | Yamazaki ............. | H01J 37/185<br>250/307 |
| 2017/0213694 | A1 | 7/2017 | Lihl et al. | |

OTHER PUBLICATIONS

International Searching Authority, The International Search Report and Written Opinion in relation to corresponding application No. PCT/EP2019/076594, 19 Pages, mailed Oct. 18, 2019.

* cited by examiner

SYSTEM AND METHOD FOR INSERTING A SAMPLE INTO A CHAMBER

FIELD OF THE INVENTION

The present disclosure relates to loading and unloading an object into and from an enclosure, for example for use in a laboratory, for material processing, or the like.

BACKGROUND OF THE INVENTION

The present disclosure relates to a system and method for moving a sample relative to a chamber.

An enclosure, or a chamber, may be used to provide and maintain a specific environment to an object that is to be investigated, treated, or otherwise processed. For example, it may be helpful to investigate some material properties in an accurately defined and controlled environment. In some examples, an object may be exposed to a relatively low temperature of below 100 K. The enclosure or chamber may be referred to as an environmental chamber or, under specific conditions, a cryostat.

In order to prevent disturbances, it may be helpful to thermally insulate the inside of the chamber from the outside. For this purpose, it may be helpful to suppress an exchange of gaseous and/or liquid matter between the inside and the outside of the chamber. In particular, it may be helpful to reduce an access time when inserting a sample into the chamber, or removing a sample from the chamber. Further, it may be helpful to avoid and reduce a contact between objects that come from the outside of the chamber with the inside of the chamber.

Moreover, it may be helpful to reduce space that is occupied by a system for inserting and removing a sample into and from the chamber. The cost and time expenses for such a system may be further reduced if the use of a cryogen was not necessary.

SUMMARY OF THE INVENTION

Against this background, the subject matter disclosed herein improves a system and method for inserting a sample into a chamber. The problems known in the art may be solved by the subject matter of claim 1. Specific embodiments or examples are given according to the dependent claims.

Disclosed herein is a sample insertion system. The system comprises a channel, a sealing element and a vacuum device. The channel has a port connectable to a chamber. The vacuum device may decrease a pressure in the channel. The sealing element is arranged in the channel and seals off a volume from the channel. The sealing element comprises a carrier member to carry a sample. The sealing element is configured to move the carrier member towards the port in response to the pressure in the channel decreasing below a pressure in the volume sealed-off by the sealing element.

According to the sample insertion system, the pressure inside the channel may be decreased by operating the vacuum device. The pressure inside the volume sealed-off by the sealing element may remain unaffected or less affected by the operation of the vacuum device. As the vacuum device operates to decrease the pressure inside the channel, a pressure difference or a pressure gradient may be created between the volume sealed-off by the sealing element and the rest of the channel, resulting in a force directed from the volume sealed-off by the sealing element towards the rest of the channel. As a result, the volume sealed-off by the sealing element may extend, in particular along the channel towards the port. Accordingly, a sample attached to the carrier member of the sealing element may be moved towards the port in a pressure-dependent manner.

The sample insertion system as described herein may allow for a sample to be quickly moved towards the port of a channel, for example, to be inserted into a chamber. In comparison to systems having a rigid physical structure reaching inside of a chamber from the outside, the samplee insertion system as described herein may contribute to reducing space requirement. Furthermore, since the pressure in the channel may be reduced using the vacuum device, a sample may be inserted into the chamber without using a coolant, a cryogen, or any other substance to regulate the temperature of the channel.

The channel may be provided as a conduit for transporting the sample inside. The channel may be sealable in a gas-tight manner. The channel may comprise or be part of an air lock. The channel may have an elongated shape with a circular cross-section, or a polygonal cross-section, or a combination thereof. The channel may linearly extend from the port. The cross-sectional area of the channel may be constant, or at least partially decrease or increase towards the port. In some examples, the channel may have a bending or curved portion. The channel may be coated, sheathed or otherwise treated on the outside to thermally insulate an interior volume of the channel from the outside. The channel may be coated, sheathed or otherwise treated on the inside to facilitate the mechanical movement of the sealing element inside the channel. The channel may comprise an access port apart from the port to be connected to a chamber to allow access to its interior volume, for example, to attach a sample to the sealing element or to detach it from the sealing element.

The chamber may refer to an enclosure to provide a controlled environment in terms of temperature and/or pressure. Further, the composition of the content inside the chamber may be controllable. In some examples, the chamber refers to a cryostat for maintaining a temperature below 150 K at a vacuum pressure below $10^{-4}$ $N/m^2$.

The channel may be operatively connectable to the chamber via the port. The port may have a cross-section having a shape and/or size corresponding to an opening of the chamber. The channel may further comprise a mechanism to be fixed to the chamber. The port may allow the channel to be connected to a chamber in a gas-tight and pressure-tight manner. For this purpose, the channel may comprise an additional sealing structure, for example an O-ring made of a synthetic, rubber or silicone material.

The vacuum device may be operable to reduce the pressure inside the channel by removing or extracting fluid from the channel. In the present disclosure, a fluid may refer to a gas, a liquid, or a mixture thereof. For this purpose, the vacuum device may be fluidly connected or connectable to the chamber. The vacuum device may comprise a vacuum pump or any other device for reducing the pressure.

The expression sealing off may in particular refer to separating a partial volume of the channel from the rest of the channel in a gas-tight manner. The sealing element may be gas-impermeable in order to maintain the pressure inside the sealed-off volume independent from the operation of the vacuum device. In some examples, the sealing element comprises a sealing structure, for example an O-ring, to seal against an inner surface of the channel.

The carrier member may be gas-impermeable to maintain the pressure inside the volume sealed-off by the sealing element. The carrier member may be made of a rigid material, or comprise a rigid portion. The carrier member may comprise a portion to which a sample is to be attached. The carrier member may generally have a flat shape, a bent portion, and/or a curvature. The carrier member may have a cross-section with a shape matching with the cross-section of the channel. The carrier member may be, for example, made of metal, such as steel, steel alloy, titanium, aluminum, carbon fiber reinforced polymer, high performance plastic, such as PEEK, etc.

According to an example, the sealing element is movable towards the port in response to the pressure in the channel decreasing below the pressure in the volume sealed-off by the sealing element. In this example, the sealing element may separate a portion of the channel in a gas-tight manner from the rest of the channel that is connected to the vacuum device. Further, the channel and the sealing element may be arranged such that, when the vacuum device decreases the pressure inside the channel, the portion that is separated from the rest of the channel may extend such as to move the sealing element towards the port. Accordingly, the portion of the channel that is separated from the rest of the channel may correspond to the volume sealed-off by the sealing element.

According to an example, the sealing element is extendable towards the port in response to the pressure in the channel decreasing below the pressure in the volume sealed-off by the sealing element. In this example, the sealing element may enclose a portion of the channel in a gas-tight manner, thereby sealing off this portion from the rest of the channel. The channel and the sealing element may be arranged such that, when the pressure inside the channel decreases, the volume sealed-off by the sealing element may extend such as to extend the sealing element accordingly, and to thereby move the carrier member towards the port. Accordingly, the portion of the channel that is enclosed by the sealing member may correspond to the volume sealed-off by the sealing element.

According to an example, the sealing element is configured to seal off the volume in a gas-tight manner. In particular, the carrier member may be made of or coated with a gas-impermeable material. The gas-tight sealing by the sealing element may allow for a pressure difference between the volume sealed-off by the sealing element and the channel to be maintained.

According to an example, the sealing element further comprises a sleeve member connected to the carrier member. The carrier member and the sleeve member in combination may seal the volume sealed-off by the sealing element in a gas-tight manner. The carrier member and/or the sleeve member may be shaped and/or sized according to an interior of the channel. For example, the channel may have a cylindrical inner shape. The carrier member may be provided as a gas-impermeable plate-like structure arranged perpendicular to the cylinder axis of the channel, or parallel to the port of the channel. The sleeve member may be provided as an extendable structure arranged along the cylinder axis of the channel. The carrier member and the sleeve member may be connected to each other in a gas-tight manner. The sealing element may further comprise an additional structure, such as an O-ring, to additionally support the gas-tight sealing against the inside of the channel.

According to an example, the channel has an elongated shape along an axis traversing the port. The sleeve member may be extendable and retractable along the axis, and the carrier member may be movable along the axis. The sleeve member may be provided as at least one of a gaiter, a bellows, a boot, a flexible tube, a telescopic tube, or a combination thereof to allow the volume sealed-off by the sealing element to extend in response to the pressure in the channel decreasing. The sleeve member may be fixed to an end of the channel that is opposite to the port of the channel. In examples where the channel has a cylindrical shape, the sleeve member may be extendable and retractable along the cylinder axis. The carrier member may be provided at an end face of the sealing element facing the port of the channel. The carrier member may be physically coupled to the sleeve member so as to move in response to the sleeve member extending and retracting along the cylinder axis of the channel.

According to an example, the sample insertion system further comprises a retracting device configured to retract the sealing element in a direction opposite to a force caused by a pressure difference between the volume sealed-off by the sealing element and the channel. The sealing element may be coupled to the retracting device. Accordingly, the retracting device may be used to move or stop the sealing element in a controlled manner. In particular, the retracting device may be operated to prevent the sealing element from being uncontrollably accelerated towards the port and reaching an undesirably high velocity.

The pressure inside the channel may be reduced, for example, to a ultrahigh vacuum level of $10^{-7}$ to $10^{-10}$ N/m$^2$, while the pressure in the volume sealed-off by the sealing element remains at the atmospheric level, for example about $10^5$ N/m$^2$. A resulting pressure difference between the volume sealed-off by the sealing element and the channel may accelerate the sealing element to reach a very high velocity towards the port of the channel. The retracting device may exert a constant force in a direction opposite to the direction towards the port to prevent the sealing element from extending too rapidly.

Accordingly, the retracting device may be operable to generate and apply a retracting force on the sealing element to at least partially compensate the force caused by the pressure difference between the volume sealed-off by the sealing element and the channel. The retracting device may be located at a position that is proximate to an end of the channel remote from its port. For example, the retracting device may comprise a winch to pull a cable, a rope, a cord, a line or the like, that is connected to the sealing element at one end and to the winch at the other end. The retracting device may further comprise an electromotor, or any other actuator, to drive the winch.

According to an example, the sample insertion system further comprises a housing to enclose the channel in a gas-tight manner. The housing may comprise an access port to the channel. In particular, the housing may allow the sample insertion system to be installable to a chamber as a unit. In some examples, the housing may allow the sample insertion system to be portable. The housing may further enclose a retracting device as described above, and any further structural and/or functional features of the sample insertion system.

The access port of the housing may provide access to the inside of the channel, for example, to position a sample inside the channel or to remove a sample from the channel. For this purpose, the channel may comprise an access port, as mentioned above. The access port of the housing and/or the access port of the channel may allow for a gas-tight sealing from the outside.

According to another aspect of the present disclosure, a system comprises a chamber, a channel, a sealing element, and a vacuum device. The chamber provides an environment in which a temperature and/or a pressure is controlled. The channel is connected to the chamber. The vacuum device may decrease a pressure in the channel. The sealing element is arranged in the channel and seals off a volume from the channel. The sealing element comprises a carrier member to carry a sample. The sealing element is configured to move the carrier member towards and/or into the chamber in response to the pressure in the channel decreasing below a pressure in the volume sealed-off by the sealing element.

Accordingly, a system is disclosed in which a sample insertion system, or any embodiments thereof, as disclosed above is connected to a chamber. The sealing element may move the carrier member, and thus the sample if attached to the carrier member, beyond the port of the channel so as to insert it into the chamber. The features of the system, unless otherwise indicated, may correspond to those of the sample insertion system described above.

According to an example, the chamber may be a cryostat providing a temperature below 300 K, or below 100 K, or below 5 K, or below 1 K. Besides, the chamber may be any other environmental chamber providing and maintaining a temperature, pressure, or composition-controlled environment. In an example, the chamber may be a material processing chamber, such as a furnace, an incubator, a cleanroom, a desiccator, an autoclave, or the like.

According to a further aspect of the present disclosure, a method of inserting a sample into a chamber is provided. The method comprises the method steps of connecting a channel to a chamber; sealing off a volume from the channel using a sealing element; coupling a sample to the sealing element; and decreasing a pressure in the channel. The sealing element may be configured to move the sample towards the chamber in response to the pressure in the channel decreasing below a pressure in the volume sealed-off by the sealing element.

The method steps as indicated above are in an exemplary order and can be rearranged in a different order. For example, the method step of connecting the channel to a chamber may be performed after the sample has been coupled to the sealing element. Sealing off a volume from the channel may be performed after the channel has been connected to the chamber.

In particular, the method as disclosed herein may be applied using or operating at least part of the sample insertion system, the system, or any embodiments thereof that are described above. The features of the method may correspond to the structural and/or functional features of the sample insertion system or the system as described above. For example, the pressure inside the channel may be decreased using a vacuum device as described above.

According to the disclosure, the pressure inside the volume sealed-off by the sealing element may remain unaffected or less affected by the decrease in pressure inside the channel. As a result, a pressure difference is created between the volume sealed-off by the sealing element and the rest of the channel. The pressure difference results in the volume sealed-off by the sealing element extending towards the channel, in particular towards its port. Accordingly, if attached to the sealing element, a sample may be moved towards the port of the channel in a pressure-dependent manner.

According to an example, the method further comprises a method step of mechanically retracting the sealing element opposite to a force caused by a pressure difference between the volume sealed-off by the sealing element and the channel. For example, the retracting of the sealing element may be performed using the retracting device as described above.

According to an example, the method further comprises moving the sample away from and/or out of the chamber by increasing a force exerted for mechanically retracting the sealing element. According to this example, the sample insertion system or the system as described above may be operated also for removing a sample from inside a chamber.

According to an example of the method, the sealing element is extendable, and the volume sealed-off by the sealing element extends in response to the pressure in the channel decreasing. The sealing element may correspond to the sealing element or any of its examples as described above.

According to an example, the method further comprises adjusting the pressure in the channel to a pressure in the chamber. For example, the pressure in the chamber may be adjusted to an ultrahigh vacuum level of $10^{-7}$ to $10^{-10}$ N/m$^2$. The pressure inside the channel may be decreased, at least approximately, to this level in order to prevent a large pressure gradient between the channel and the chamber.

In the following, examples of the present disclosure are discussed in detail with reference to the drawings.

DETAILED DESCRIPTION OF THE DRAWINGS

Figure 1:
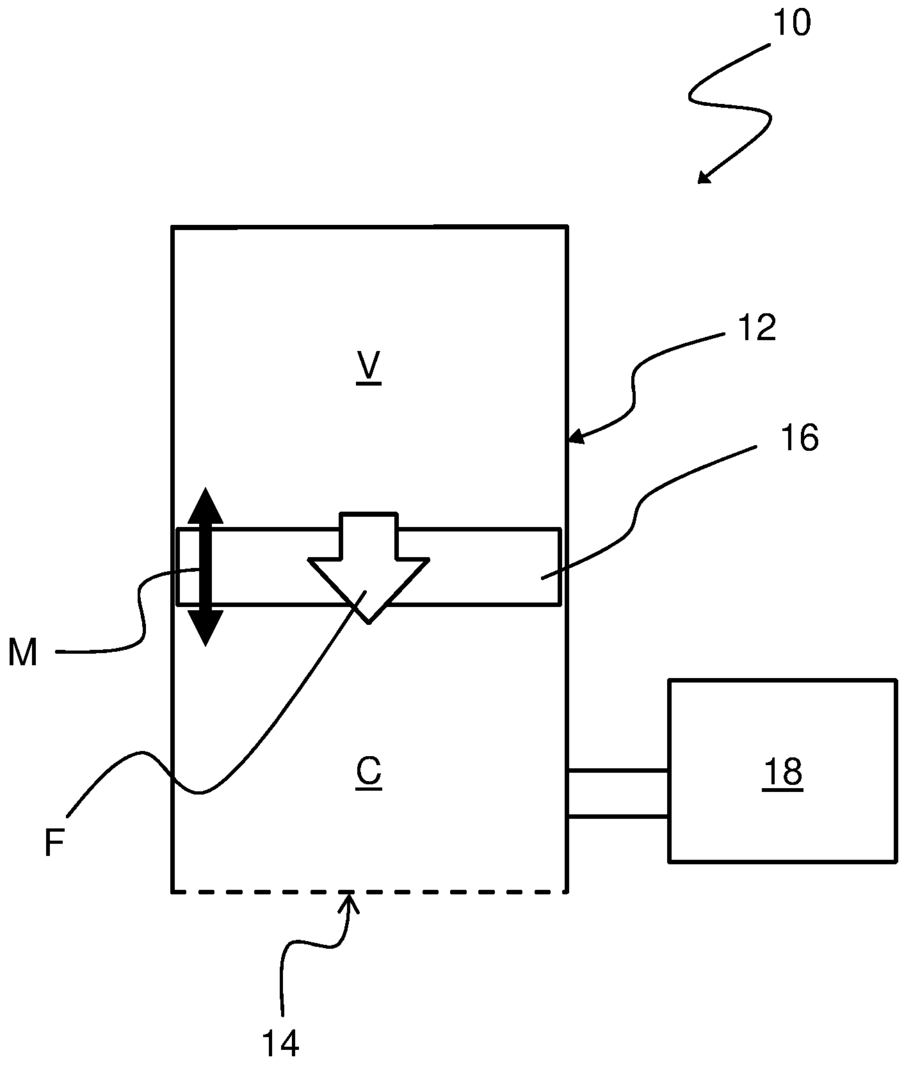
FIG. 1 shows a schematic diagram of a cross-sectional view of a sample insertion system according to an example.

FIG. 1 shows a schematic cross-sectional view of a sample insertion system 10 according to an example (not shown). The sample insertion system 10 comprises a channel 12 having a port 14 connectable to a chamber. The sample insertion system 10 further comprises a sealing element 16 and a vacuum device 18.

The channel 12 may have an elongated shape with a circular or polygonal cross-section. The channel may have a rotational symmetry along a cylinder axis. Although the channel 12 is depicted in FIG. 1 having a linear shape, the channel 12 may further comprise a bending portion, a curved portion, a junction, or a combination thereof. Also, a cross-section of the channel 12 may be constant or alter from a closed front face (the upper boundary of the channel 12 in FIG. 1) towards the port 14. For example, the channel 12 may taper or increase towards the port 14. In some examples, the channel 12 may have sections having different cross-sections in terms of shape and/or size.

The port 14 of the channel 12 may be an opening to be connected to an enclosure. As discussed above, the enclosure may be, or comprise, a chamber, such as a cryostat. The port 14 may have a circular cross-section, a polygonal cross-section, or a combination thereof. The port 14 may comprise a structural and/or functional feature to be fixed to an enclosure. For example, the port 14 may comprise a flange having fixing holes to be screwed to an enclosure. Additionally or alternatively, the port 14 may comprise a different mechanism to be fixed to an enclosure, for example a bayonet joint, a threaded portion, a friction-lock, etc. The port 14 may be further provided with a sealing means to be connected to an enclosure in a gas-tight manner.

The sealing element 16 is arranged in the channel 12. The sealing element 16 may be movably disposed in the channel 12. For example, the sealing element 16 may be movable along a cylinder axis of the channel 12, as indicated by an arrow M in the drawings. The sealing element 16 is configured to seal off a volume V from the channel 12. The volume V being sealed off from the channel 12 by the sealing element 16 may refer to the volume V of the channel 12 being separated from the rest of the channel 12 in a gas-tight manner so that a gas exchange and/or a pressure compensation between the channel and the sealed-off volume V is suppressed or precluded. The sealing element 16 may be gas impermeable so as to separate the volume V of a channel 12 in a gas-tight manner, thereby sealing it off from the channel 12. For this purpose, the sealing element 16 may at least partially enclose the volume V. Alternatively or additionally, the sealing element 16 may seal against an internal side of the channel 12 to separate the volume V from the channel 12.

It is understood that both the sealed-off volume V and a remaining portion C of the channel 12 alters as the sealing element 16 moves inside the channel 12. As an example, the sealed-off volume V increases as the sealing element 16 moves towards the port 14, while the remaining portion C of the channel 12 decreases. Similarly, the sealed-off volume V decreases as the sealing element 16 moves away from the port 14, while the remaining portion C of the channel 12 increases.

The sealing element 16 may comprise a carrier member (not shown in FIG. 1) to carry a sample. The carrier member may be a rigid portion or a structural feature of the sealing element 16 to which a sample may be attached and/or fixed. The carrier member may be provided with a fixing mechanism to secure a sample. The sample as used herein may refer to an object to be investigated and/or a container containing it.

The vacuum device 18 may decrease the pressure in the channel 12, in particular in the remaining portion C of the channel 12 that is not sealed-off by the sealing element 16. The vacuum device 18 may comprise a vacuum pump to intake fluid, in particular gas molecules, from the channel 12. The vacuum device 18 may be capable of decreasing a pressure inside the channel 12 to a high vacuum level of $10^{-1}$ to $10^{-7}$ N/m$^2$, or to an ultrahigh vacuum level of $10^{-7}$ to $10^{-10}$, or to an even higher vacuum level.

The sealing element 16 may be movable towards the port 14 in response to the pressure in the channel 12 decreasing below a pressure in the volume V sealed-off by the sealing element 16. For example, the sealing element 16 may be configured to seal-off the volume V from the channel 12 in a gas-tight manner so as to maintain a pressure difference between the volume V and the remaining portion C of the channel 12. In some examples, the pressure inside the volume V remains at an atmospheric level of about $10^5$ N/m$^2$ while the vacuum device 18 decreases the pressure inside the remaining portion C of the channel 12. The sealing element may move and/or extend towards the port 14 when the pressure inside the remaining portion C of the channel 12 decreases below the pressure inside the volume V. A pressure difference between the sealed-off volume V and the remaining portion C of the channel 12 results in a force F being exerted on the sealing element 16 towards the port. The sealing element 16 is configured, e.g. shaped and arranged with respect to the channel 12, so as to increase the sealed-off volume V in response to said pressure difference and the resulting force F. The carrier member of the sealing element 16 may be arranged such as to move towards the port 14 in response to the sealing element 16 moving and/or extending towards the port 14.

Figure 2A:
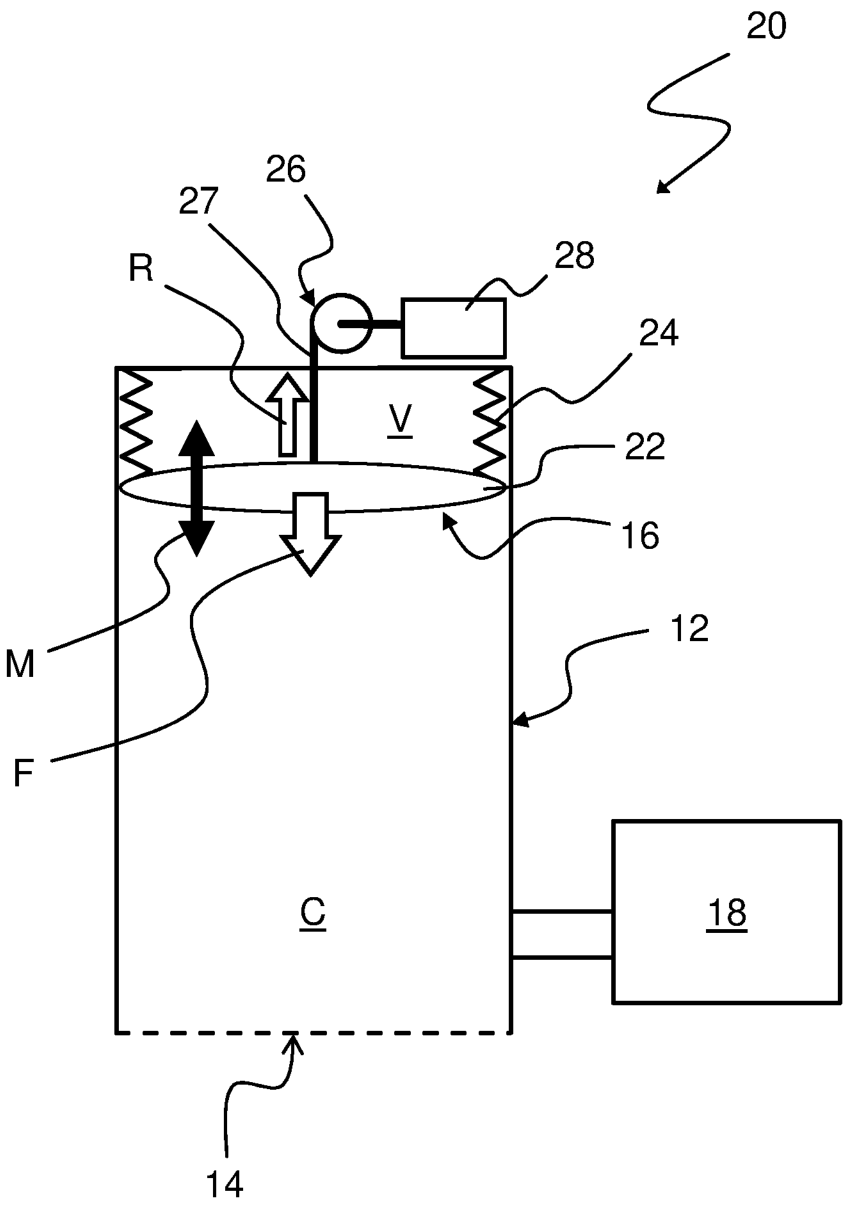
FIGS. 2A and 2B show schematic diagrams of cross-sectional views of a sample insertion system according to an example.
Figure 2B:
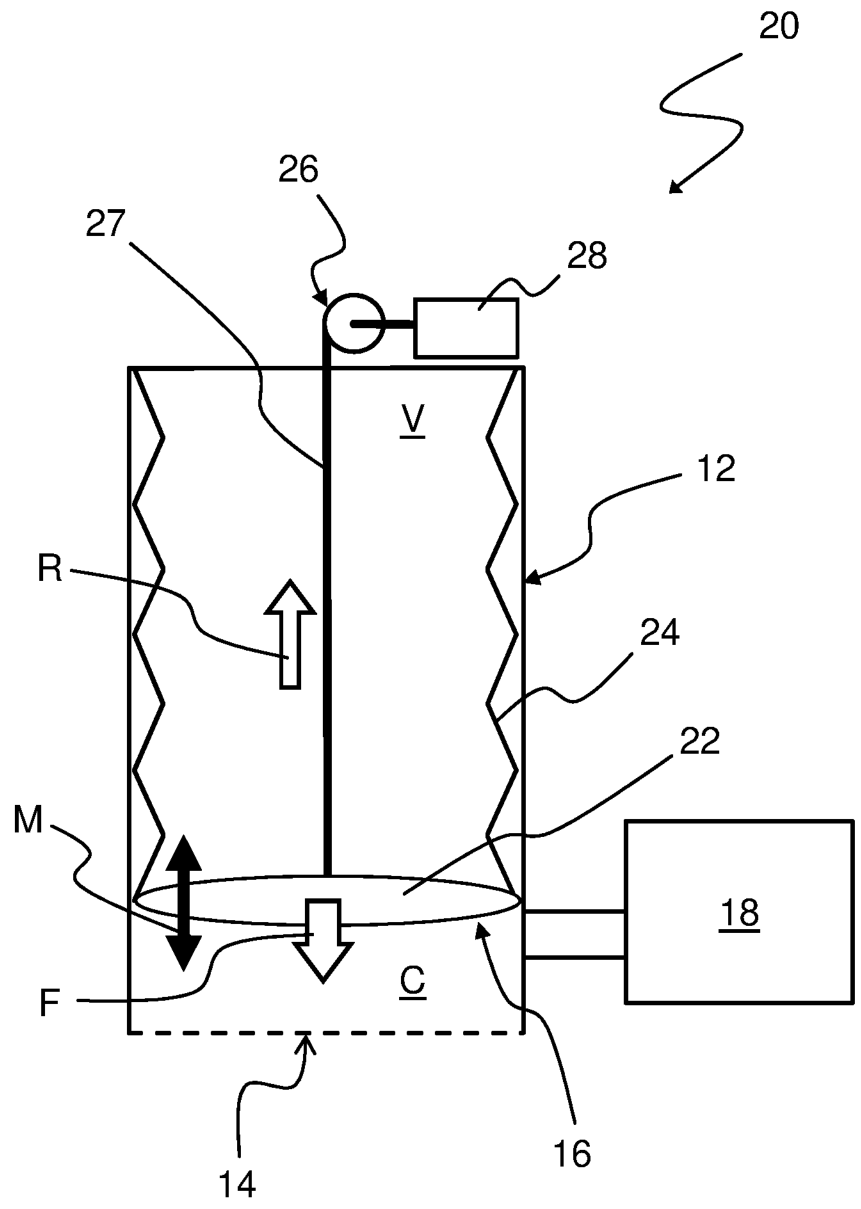

FIGS. 2A and 2B show schematic cross-sectional views of another example of a sample insertion system 20. Unless otherwise indicated, structural and functional features of the sample insertion system 20 correspond to, or are similar to, or are identical with, those of the sample insertion system 10 as described above with reference to FIG. 1. Features of the sample insertion system 20 that correspond to those of the sample insertion system 10 are indicated with the same reference signs.

The sealing element 16 of the sample insertion system 20 comprises a carrier member 22 to carry a sample. The carrier member 22 may be a rigid portion or a structural feature of the sealing element 16 to which a sample may be attached and/or fixed. For example, the carrier member 22 is a gas-impermeable metal plate having a cross-section that corresponds to the cross-section of the channel 12 in terms of shape and/or size. The carrier member 22 may be made of steel, an alloy, titanium, aluminum, or the like. Further, the carrier member 22 may be provided with a fixing mechanism (not shown) to secure a sample. For example, the carrier member 22 may have a threaded portion, a bayonet joint, a grooved portion or a complementary protrusion, or a latch, or a combination thereof, to engage with the sample.

The sealing element 16 of the sample insertion system 20 additionally comprises a sleeve member 24. The sleeve member 24 is located at an end of the channel 12 opposite to the port 14. The sleeve member 24 may comprise a flexible portion to extend towards the port 14 of the channel 12. Alternatively or additionally, the sleeve member 24 may comprise a portion that is extendable and retractable. For example, the sleeve member 24 comprises a portion that is telescopic, foldable, or being able to be rolled up and out. In some examples, the sleeve member 24 may be a gaiter, a bellows, a boot, a flexible tube, a telescopic tube, or a combination thereof. FIGS. 2A and 2B, in which the sleeve member 24 is depicted as a bellows, show the sleeve member 24 in a retracted state and an extended state, respectively. The sleeve member 24 may be configured to extend beyond the port 14, i.e. to reach to the outside of the channel 12 through the port 14.

The sealing element 16 encloses the volume V through the carrier member 22 and the sleeve member 24. The sealing element 16, and thus the sleeve member 24, may be open or openable to the outside of the channel 12 so that the pressure inside the sealed-off volume V remains at an ambient pressure of, for example, about $10^5$ N/m$^2$.

Accordingly, the sleeve member 24 is configured to extend when the pressure in the remaining portion C of the channel 12 decreases. Assuming that the channel 12 has a cylindrical shape, the sleeve member 24 is arranged to extend and retract along the cylinder axis of the channel 12. The carrier member 22 and the sleeve member 24 are physically joined to each other in a gas-tight manner. Accordingly, the carrier member 22 is moved towards the port 14 by the sleeve member 24 extending in response to the pressure the remaining portion C of the channel 12 decreasing. As a result, a lateral surface of the sleeve element 22 extends, causing the volume V that is sealed-off from the channel 12 by the sealing element 16 to increase.

The sample insertion system 20 further comprises a retracting device 26. The retracting device 26 is coupled to the sealing element 16. In some examples, the retracting device 26 is physically connected to the carrier member 22 via a connecting means 27 fixed to both the retracting device 26 and the carrier member 22. For example, the connecting means comprises a rope, a wire, a cord, a chain, a cable, or the like to connect between the sealing element 16 and the retracting device 26. The retracting device 26 may be configured to apply, adjust and/or maintain a tension of the connecting means 27. For example, the retracting device 26 is configured to let out and pull in the connecting means 27. In some examples, the retracting device 26 is a winch to wind up and wind out the connecting means 27 driven by an electromotor 28.

The retracting device 26 may exert a retracting force R having a component opposite to the force F that is caused by a pressure difference between the volumes C and V. Accordingly, the retracting device 26 may allow for controlling the velocity of the carrier member 22 towards the port 14 and/or in the same axial direction beyond the port 14. Further, the retracting device 26 may be used for pulling back the carrier member 22 towards the retracting device 26.

Figure 3A:
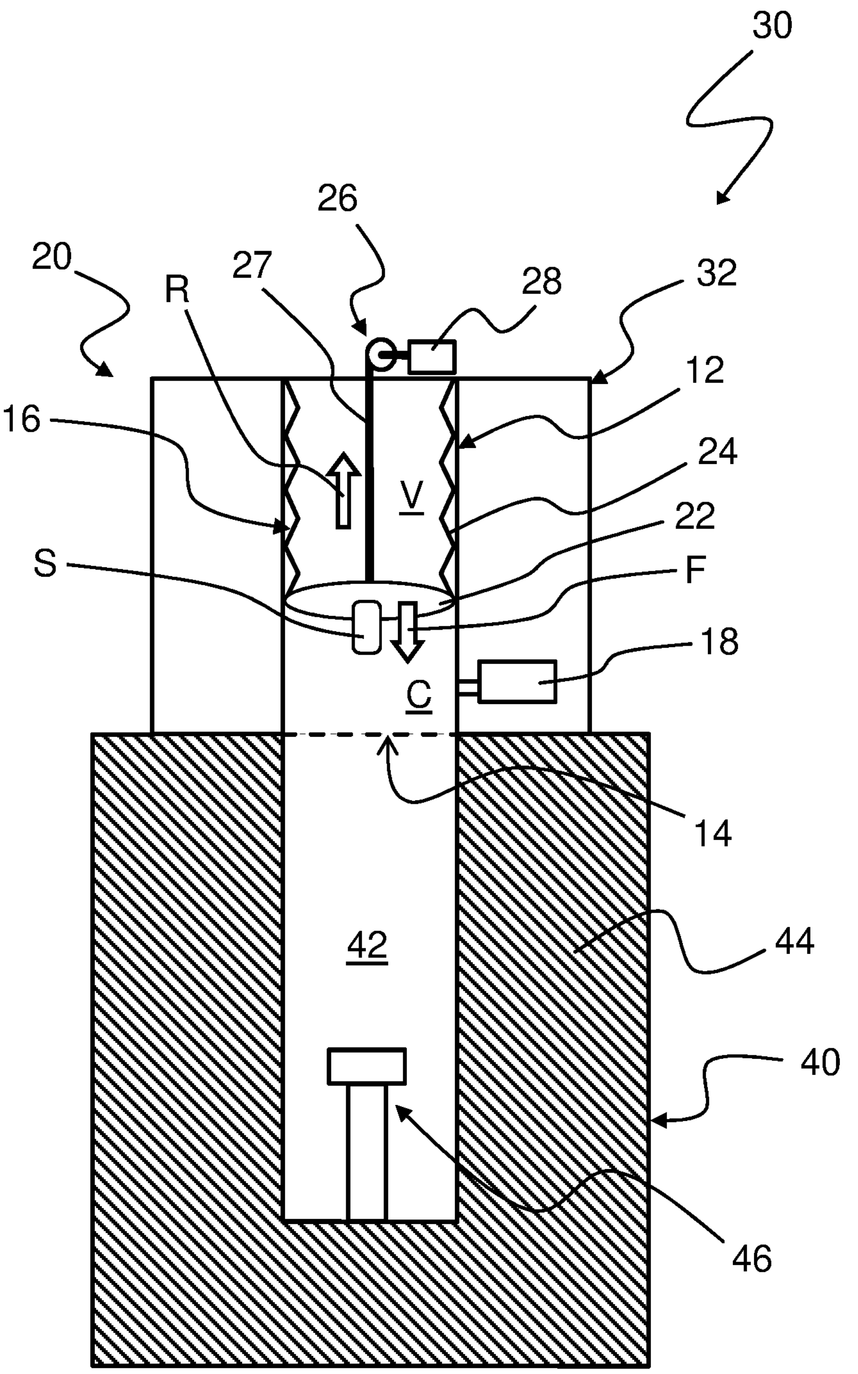
FIGS. 3A and 3B show schematic diagrams of cross-sectional views of a system according to an example.
Figure 3B:
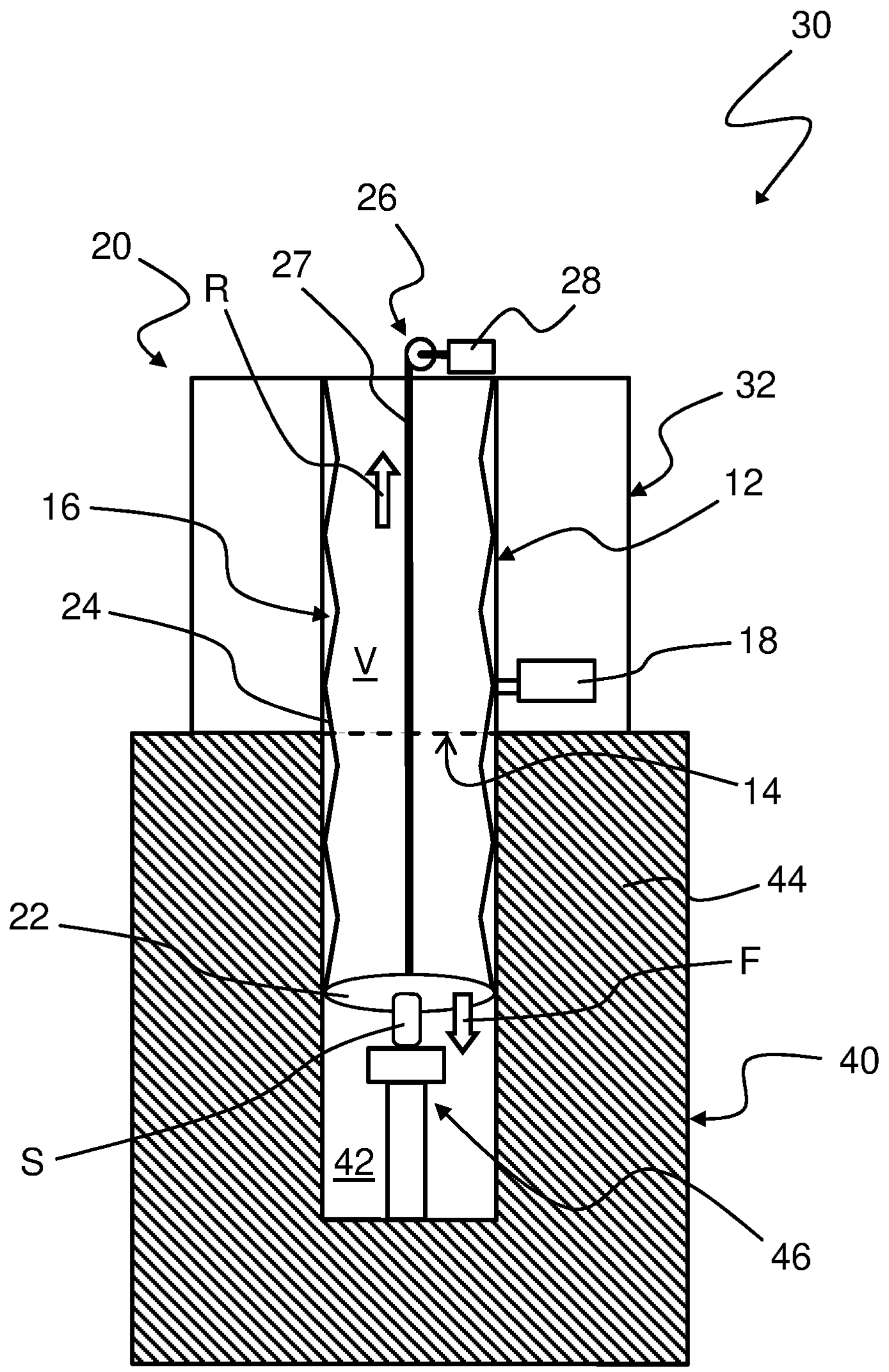

FIGS. 3A and 3B show schematic cross-sectional views of an example of a system 30 comprising the sample insertion system 20 as described above with reference to FIGS. 2A and 2B. The system 30 further comprises a chamber 40, to which the sample insertion system 20 is connected. In particular, the port 14 of the channel 12 is arranged so as to communicatively connect to an opening of the chamber 40. The port 14 may comprise a connecting means in the above described manner to provide a gas-tight and/or vacuum-tight coupling with the chamber 40.

The sample insertion system 20 as shown in FIGS. 3A and 3B further comprises a housing 32 enclosing the channel 12 in a gas-tight manner. In some examples, the sample insertion system 20 may be provided as an entity enclosed by the housing 32. Although not explicitly shown in FIG. 3, the housing 32 may comprise an access port allowing an access to the inside of the channel 12, for example, for inserting and removing a sample S. In this example, the access port of the housing 32 seals the inside of the housing 32 from the outside in a gas-tight and/or vacuum-tight manner.

An interior space 42 of the chamber 40 is enclosed by a wall 44. The wall 44 may seal the interior space 42 of the chamber 40 from the outside in a gas-tight, vacuum-tight, heat-impermeable, radiation-impermeable and/or electrically insulating manner. The chamber 40 may be operated to provide and maintain a controlled environment in terms of temperature and/or pressure. Further, the composition of the fluid inside the chamber 40 may be controllable.

In some examples, the chamber 40 refers to a cryostat for maintaining a temperature below 150 K at a vacuum pressure below $10^{-4}$ N/m$^2$. In specific examples, the chamber 40 may be a cryostat providing a temperature below 300 K, or below 100 K, or below 5 K. In further examples, the chamber 40 may be a material processing chamber, such as a furnace, an incubator, a cleanroom, or the like. The chamber 40 may further comprise a platform 46 on which the sample S is to be placed. A pressure inside the interior space 42 of the chamber 40 may be at a vacuum level of $10^{-4}$ to $10^{-10}$ N/m$^2$.

To insert the sample S into the chamber 40, the sample S is coupled to the carrier member 22, for example via an access port of the housing 32 (not shown). The pressure in the channel 12 is decreased, for example to the same level as inside the interior space 42 of the chamber 40, using the vacuum device 18. As a result, the volume V sealed-off by the sealing element 16 extends towards and beyond the port 14 into the interior space 42 of the chamber 40.

FIG. 3A shows a state of the system 30 in which the sealing element 16 is extending inside the channel 12, towards the port 14. FIG. 3B shows another state of the system 30 in which the sealing element 16 has extended such that the sample S is in contact with the platform 46. In the latter state of the system 30, the sample S may be moved or otherwise manipulated so as to be detached from the carrier member 24 and at the same time to be fixed to the platform 46.

In some examples, the retracting device 26 may be used to stop the sealing element 16 in a retracted state and prevent the sealing element 16 from extending until the pressure inside the channel 12 is decreased to a desired level. Then, the retracting device 26 may allow the sealing element 16 to extend by reducing the retracting force R. A reduced level of the retracting force R may be maintained in order to prevent the sealing element 16 from extending too rapidly. The operation of the retracting device 26 may be timed such as to stop the extension of the sealing element 16 exactly when the sample S reaches the platform 46.

Accordingly, the sealing element 16 and more specifically the carrier member 22 enters the interior space 42 of the chamber 40. As a result, the sample S attached to the carrier member 22 is inserted into the chamber 40. The sealing member 16 may extend into and inside the interior space 42 of the chamber 40 until the carrier member 22 or the sample S reaches the platform 46. The sample S may be provided with a structure to be fixed to the platform 46 without the need for mechanically manipulating the sealing element 16.

Figure 4A:
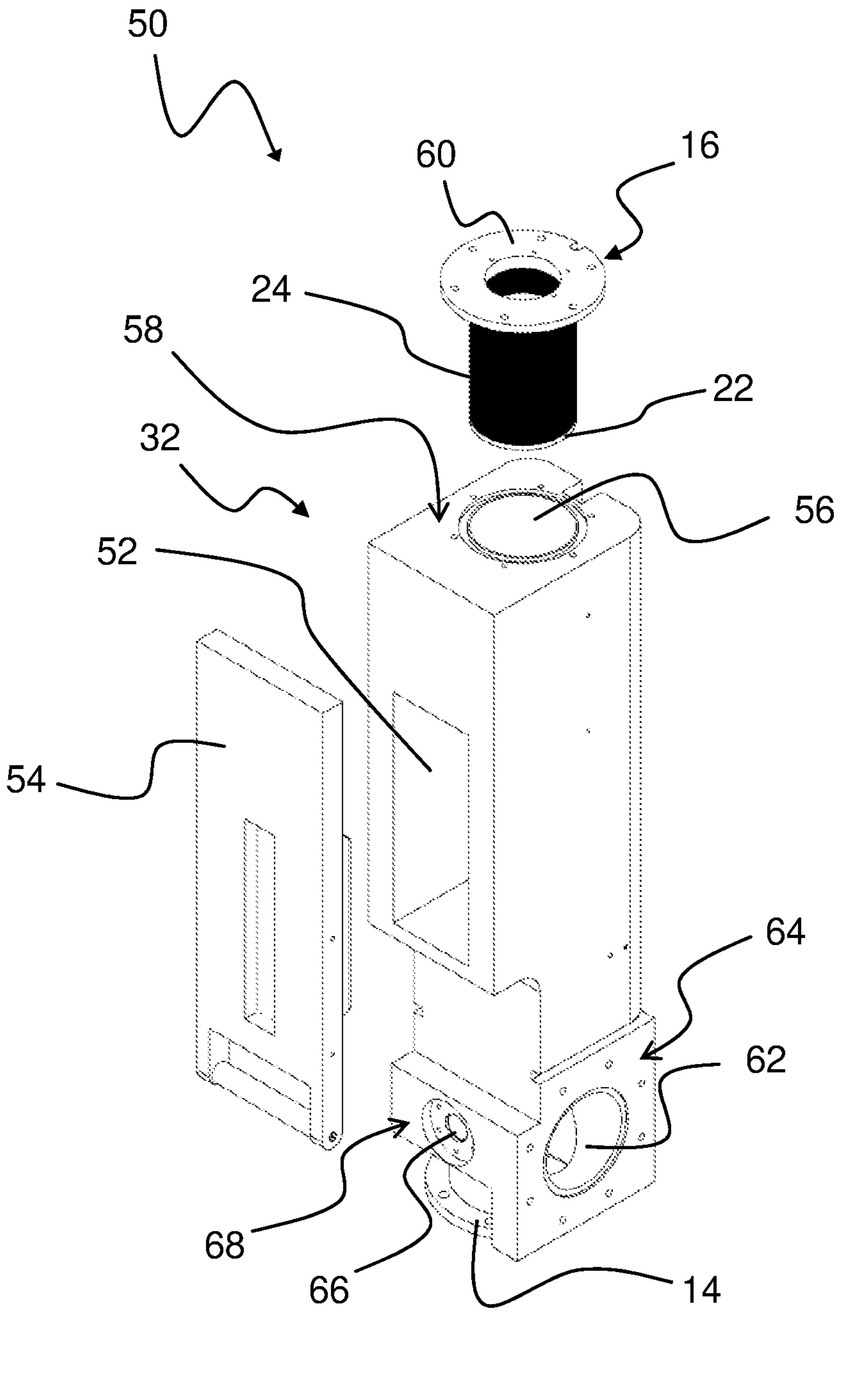
FIGS. 4A and 4B show schematic diagrams of a perspective view of a sample insertion system according to an example.
Figure 4B:
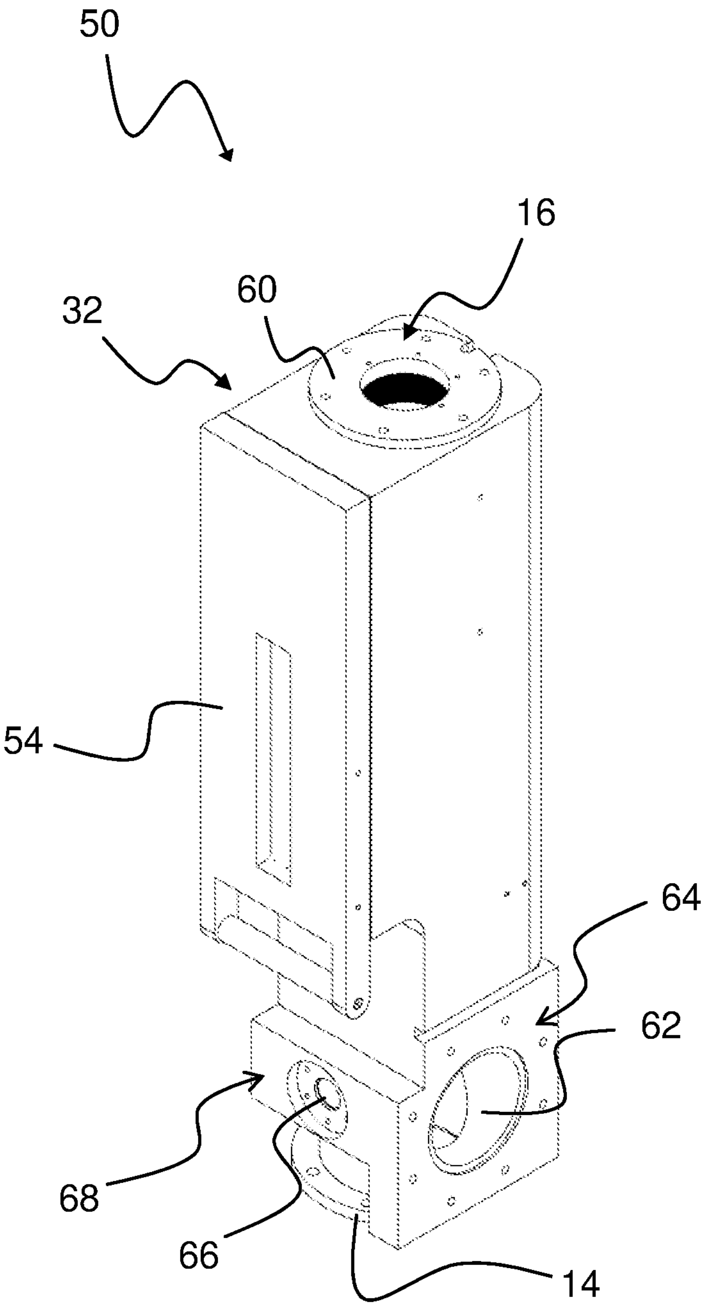

FIGS. 4A and 4B show schematic perspective views of an example of a sample insertion system 50. Structural and functional features of the sample insertion system 50 may correspond to, or are similar to, or are identical with, those of the sample insertion system 10 or 20 as described above with reference to FIGS. 1 to 3B. Features of the sample insertion system 50 that correspond to those of the sample insertion system 10 or 20 are designated with the same reference signs. FIG. 4A depicts some parts of the sample insertion system 50 being disassembled from the housing 32. FIG. 4B depicts the sample insertion system 50 in an assembled state, i.e. with the sealing element 16 being fully inserted into the chamber 12.

The housing 32 of the sample insertion device 50 has a block shape with structural features for assembly and installation. The housing 32 comprises an access port 52 for providing access to channel 12. The access port 52 may be closable by a door 54, which is configured to seal the access port 52 in a gas-tight manner.

The housing 32 further comprises an upper port 56, which is an opening formed in an upper surface 58 of the housing 32, for inserting the sealing element 16, which comprises the carrier member 22 and the sleeve member 24 as described above. The sealing element 16 may further comprise a flange 60 to arrest against the upper surface 58 when being inserted. The flange 60 and the upper surface 58 of the housing 32 may have corresponding fixing holes to be fixed together, for example, by means of screws or bolts.

The housing 32 further comprises a first lower port 62, which is an opening formed in a lateral surface 64 of the housing 32, to be connected to a vacuum device. For example, the first lower port 62 may be configured to be connected to the vacuum device 18 as described above with reference to FIGS. 1 to 3B. The lateral surface 64 may further have fixing holes to be connected with a tube, a vacuum flange, a sealing, or the like by means of, for example, screws or bolts.

The housing 32 further comprises a second lower port 66, which is an opening formed in another lateral surface 68 of the housing 32. The second lower port 66 may be used, for example, to install a valve to control a cross section of a conduit between the channel 12 and a vacuum device connected to the first lower port 62.

The housing 32 further comprises the port 14 having a flange portion with fixing holes. The flange portion may be connectable to a port of a chamber, for example the chamber 40 as described above with reference to FIGS. 3A and 3B. The flange and fixing holes may be used for a gas-tight connection to another flange, a sealing means, or the like of the chamber using, for example, screws or bolts.

Figure 5:
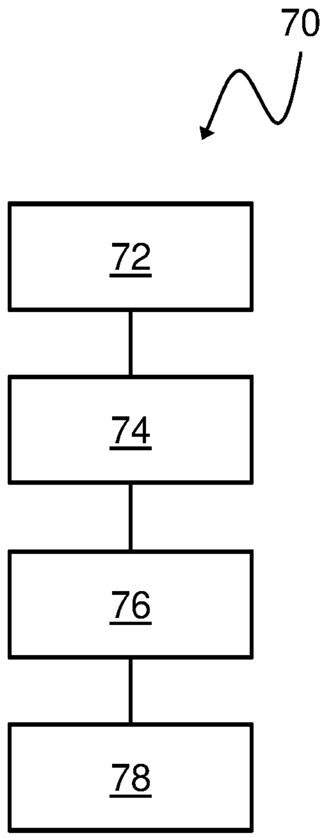
FIG. 5 shows a flow diagram of a method according to an example.

FIG. 5 shows a flow diagram of an example of a method 70 of inserting a sample S into a chamber 40. In particular, any of the method steps of the method 70 may be applicable to, or performed using, any of the sample insertion devices 10, 20 and 50, and, if applicable, the chamber 40 as described above.

According to the method 70, at 72, a channel is connected to an enclosure, for example a chamber. For example, the channel may have a port which is connected to a port of the enclosure. The enclosure may be an environmental chamber, in particular a cryostat, or any other chamber for providing and maintaining a desired temperature and/or pressure in its inside.

At 74, a volume is sealed off from the channel using a sealing element. The sealing element may correspond to the sealing element 16 as described above. Sealing off may refer to separating a partial volume of the channel from a remaining portion of the channel in a gas-tight manner. The sealing element may seal off said volume by suppressing a gas exchange between the sealed-off volume and the remaining portion of the channel. Alternatively or additionally, the sealing element may seal off said volume by at least partially enclosing the same.

At 76, a sample is coupled to the sealing element. The sample may refer to an object to be investigated, processed, treated, or the like, as described above. The sample may further include a container containing such an object.

At 78, a pressure is decreased in the channel. The pressure may be decreased using a vacuum device as described above. In the method, the sealing element may move the sample coupled to the carrier member towards the chamber in response to the pressure in the channel decreasing below a pressure in the volume sealed-off by the sealing element. According to the method 70, the pressure inside the sealed-off volume remains less affected by the decrease of pressure inside the channel. Accordingly, a pressure difference between the sealed-off volume and the remaining portion of the channel is generated, which causes a force being exerted on the sealing element. The sealing element may be arranged in the channel so as to move towards the port of the channel when exposed to said force.

Furthermore, the sealing element may be mechanically retracted in a direction opposite to the force caused by said pressure difference between the sealed-off volume and the remaining portion of the channel. The sealing element may be retracted using the retracting device as described above.

Furthermore, the sample may be moved away from and/or out of a chamber by increasing a force exerted for mechanically retracting the sealing element. Accordingly, the sample insertion system or the system as described above may be operated also for removing a sample from inside a chamber.

Furthermore, the pressure in the channel may be adjusted to a vacuum level between $10^{-1}$ to $10^{-13}$ $N/m^2$. In particular, the pressure inside the channel may be decreased, at least approximately, to this level in order to prevent a large pressure gradient between the channel and the chamber.

The systems and method as disclosed herein contribute to suppressing an exchange of gaseous and/or liquid matter between the inside and the outside of a chamber. In particular, the disclosed subject matter contributes to reducing an access time when inserting a sample into a chamber, or removing a sample from the chamber. Further, the disclosed subject matter allows for avoiding or reducing a contact between objects that come from the outside of a chamber with the inside of the chamber.

Moreover, the disclosed subject matter may reduce space requirement for a system for inserting and removing a sample into and from a chamber. Further, the disclosed subject matter does not require the use of a cryogen, therefore reducing cost and time expenses.

LIST OF REFERENCE SIGNS

10 sample insertion system
12 channel
14 port
16 sealing member
18 vacuum device
20 sample insertion system
22 carrier member
24 sealing member
26 retracting device
27 connecting means
28 electromotor
30 system
32 housing
40 chamber
42 interior space
44 wall
46 platform
50 sample insertion system
52 access port
54 door
56 upper port
58 upper surface
60 flange
62 first lower port
64 lateral surface
66 second lower port
68 lateral surface
70 method
72-78 method steps
C remaining portion
F force caused by pressure difference
M movement direction
R retracting force
S sample
V sealed-off volume

What is claimed is:

1. A sample insertion system, comprising
a channel having an axis and a port connectable to a chamber;
a sealing element inside the channel and comprising a carrier member, the sealing element sealing off a volume of the channel from a rest of the channel; and
a vacuum device to decrease a pressure in the rest of the channel,
wherein the carrier member is configured to carry a sample,
wherein the sealing element is configured to move the carrier member along the axis towards the port in response to the pressure in the rest of the channel decreasing below a pressure in the volume of the channel sealed-off by the sealing element, so that a pressure difference is created between the volume of the channel sealed-off by the sealing element and the rest of the channel, resulting in a force acting on the sealing element and directed along the axis towards the port.

2. The system of claim 1, wherein the carrier member is movable along the axis towards the port in response to the pressure in the channel decreasing below the pressure in the volume sealed-off by the sealing element.

3. The system of claim 1, wherein the sealing element is extendable along the axis to move the carrier member towards the port in response to the pressure in the channel decreasing below the pressure in the volume sealed-off by the sealing element.

4. The system of claim 1, wherein the sealing element is configured to seal off the volume in a gas-tight manner.

5. The system of claim 1, wherein the sealing element further comprises a sleeve member connected to the carrier member, and wherein the carrier member and the sleeve member in combination seal the volume sealed-off by the sealing element in a gas-tight manner.

6. The system of claim 5, wherein the channel has an elongated shape along the axis, wherein the sleeve member is extendable and retractable along the axis, and wherein the carrier member is movable along the axis.

7. The system of claim 6, where the carrier member is provided as a gas-impermeable plate-like structure arranged perpendicular to the axis of the channel, or parallel to the port of the channel.

8. The system of claim 1, further comprising a retracting device configured to retract the carrier member along the axis in a direction opposite to the force caused by the pressure difference between the volume sealed-off by the sealing element and the rest of the channel, wherein the sealing element is coupled to the retracting device.

9. The system of claim 1, further comprising a housing to enclose the channel in a gas-tight manner, the housing comprising an access port to the channel.

10. The system of claim 1, wherein the channel has an elongated shape with a circular cross-section, polygonal cross-section or a combination thereof, wherein the channel linearly extends from the port.

* * * * *